US005257307A

United States Patent [19]

Ise

[11] Patent Number: 5,257,307

[45] Date of Patent: Oct. 26, 1993

[54] RADIO PAGER SYSTEM WHICH TRANSMITS SECRET CODED MESSAGES FROM A CALLER TO A PAGER TERMINAL APPARATUS

[75] Inventor: Masahiro Ise, Kashihara, Japan

[73] Assignee: Sharp Kabushiki Kaisha, Osaka, Japan

[21] Appl. No.: 650,094

[22] Filed: Feb. 4, 1991

[30] Foreign Application Priority Data

| | | | |
|---|---|---|---|
| Feb. 7, 1990 | [JP] | Japan | 2-28684 |
| Feb. 7, 1990 | [JP] | Japan | 2-28685 |
| Feb. 7, 1990 | [JP] | Japan | 2-28686 |

[51] Int. Cl.[5] .......... H04M 11/00

[52] U.S. Cl. .......... 379/57; 340/825.44

[58] Field of Search .......... 379/56, 57; 340/825.44

[56] References Cited

U.S. PATENT DOCUMENTS

| | | | |
|---|---|---|---|
| Re. 32,365 | 3/1987 | Sebestyen | 340/311.1 |
| 4,336,524 | 6/1982 | Levine | 379/57 |
| 4,490,579 | 12/1984 | Godoshian | 379/57 |
| 4,994,797 | 2/1991 | Breeden | 379/57 X |
| 5,049,874 | 9/1991 | Ishida et al. | 340/825.44 |
| 5,066,949 | 11/1991 | Breeden et al. | 379/57 X |

FOREIGN PATENT DOCUMENTS

| | | |
|---|---|---|
| 0086255 | 8/1983 | European Pat. Off. . |
| 0251477 | 1/1988 | European Pat. Off. . |
| 0360228 | 3/1990 | European Pat. Off. . |
| 60-220632 | 11/1985 | Japan . |
| 61-274527 | 12/1986 | Japan . |

OTHER PUBLICATIONS

Electronics International, Paging System Broadcasts Nationwide on FM Radio Channel, Jan. 1979, p. 68.

"NTT Paging System" by Masahiro Wada, May 1, 1989 NTT Review pp. 45-53.

*Primary Examiner*—Jin F. Ng

*Assistant Examiner*—George J. Oehling

[57] ABSTRACT

A radio pager system and pager terminal apparatus used in the system are disclosed. A pager signal to be transmitted includes destination information and message specifying information for specifying a message to be transmitted. The pager terminal apparatus includes a receiver for receiving an incoming pager signal, a detector for detecting that the received pager signal is a signal destined for the pager terminal apparatus, an extracting circuit for extracting message specifying information from the pager signal transmitted to the pager terminal apparatus and message displaying apparatus responsive to the extracted message specifying information for displaying a message corresponding to the extracted message specifying information in a visually recognizable manner. The radio pager system includes the above pager terminal apparatus, a station for transmitting via radio a pager signal, and transmission terminal apparatus for supplying the destination information and the message information to the station. The data to be transmitted is not the body of the message but message specifying information, so that the amount of data to be transmitted is reduced and the communication is kept secret.

15 Claims, 4 Drawing Sheets

RADIO PAGER SYSTEM WHICH TRANSMITS SECRET CODED MESSAGES FROM A CALLER TO A PAGER TERMINAL APPARATUS

BACKGROUND OF THE INVENTION

1. Field of the Invention

The invention relates generally to radio pager systems and, more particularly, it relates to improvements in a radio pager system and a pager terminal apparatus used in this system, in which a registered caller accesses a pager base station over the public telephone line, and calls a desired pager terminal via the pager base station.

2. Description of the Related Art

A pager system is one of the systems for calling a person who is absent. A radio pager system particularly provides a service of calling a person by radio who is absent, and transmitting a message to him. One example is "pocket bell service" provided by Nippon Telegraph & Telephone Corporation (NTT) in Japan.

FIG. 1 is a typical diagram showing the configuration of a conventional pager system. Referring to FIG. 1, the radio pager system includes a public telephone line 1 used by a caller, an exchange 2, a pager base station 3 for transmitting a pager signal, and a pager terminal apparatus 4, which a callee carries about, for receiving a pager signal from the pager base station 3.

The system shown in FIG. 1 operates as follows. The registered caller accesses the pager base station 3 over the public telephone line 1. The pager base station 3 gives the caller instructions as to the procedure of calling in accordance with a predetermined program. The caller inputs a calling code assigned in advance, and stored in the pager terminal apparatus carried by the callee of concern by way of push-buttons of a telephone and the like, in accordance with the given instructions. The calling code is temporarily stored in the pager base station. The caller further inputs a message which he intends to transmit to the callee. The pager base station 3 radio-transmits the given calling code and message in a predetermined communication format.

The input of the message from the caller is conducted as follows. In a control computer of the pager base station 3, there are stored standardized sentences to each of which a code is assigned for specifying the sentence, and a table for converting the given code to character strings of the standardized sentence. The caller selects a desired standard sentence referring to a table identical with this converting table, and assigns a code corresponding to the selected standard sentence by way of push-buttons and so on. The pager base station 3 converts the inputted code to a character string in accordance with the converting table. The base station 3 further radio-transmits the message including the character strings obtained by conversion along with the assigned calling code.

FIG. 2 shows one example of a communication format. Referring to FIG. 2, data to be transmitted includes a synchronous signal bit string "SYNC", a calling code "ADDRESS", and a transmission message "MESSAGE" including character strings from the caller.

In such a radio pager system, a short calling code inputted is converted to a message at the base station, so that it is possible to cut down the amount of key manipulation by the caller. However, a pager radiowave transmitted from the base station includes data converted to character strings. Therefore, in spite of the fact that there is a need to limit the amount of data in order to keep the traffic in an appropriate range for smooth communication, the amount of data transmitted is large. As character strings of a message are transmitted, as they are, by a radiowave which anyone can pickup, it is impossible to keep communication secret. The table for converting the fixed form of sentence code to character strings of a message is stored within the computer of the pager base station. Therefore, a large amount of work is needed for making converting tables fully corresponding to the needs of a multiplicity of subscribers. Even the message frequently used between a caller and a callee needs to have the whole sentence inputted as stated above if it is not included in the converting table of the base station. While it seems possible that this problem may be solved using an individual converting table with respect to a respective subscriber, it is technically impossible to prepare an individual converting table for each subscriber in the conventional pager base station.

If each user inputs all the messages without using such a converting table, he can transmit any messages. In this case, however, not only the amount of operation by the caller is increased, but also secret communication is prevented.

SUMMARY

Therefore, an object of the present invention is to provide a pager terminal apparatus and a radio pager system which reduces the amount of data transmitted and which subsequently allow for increase in the number of subscribers.

Another object of the present invention is to provide a pager terminal apparatus and a radio pager system which reduces the amount of data transmitted and the amount of key operation required for message transmission.

Still another object of the invention is to provide a pager terminal apparatus and a radio pager system which permits secret communication as well as reducing the amount of data transmitted and the number of key operations.

The pager terminal apparatus in accordance with the present invention includes a receiver for receiving an incoming pager signal. The pager signal includes destination information representing the destination, and message specifying information for specifying a message to be transmitted to the destination. The pager terminal apparatus further includes a detector for detecting that the pager signal received by the receiver is a signal transmitted to itself, and outputting a predetermined detection signal, an extracting circuit responsive to the detection signal for extracting message specifying information from the pager signal received by the receiver, and a message displaying apparatus responsive to the message specifying information extracted by the extracting circuit for displaying the message specified by the message specifying information in a visually recognizable manner.

In the pager terminal apparatus above, the receiver receives the pager signal, and the detector detects that the pager signal is a signal transmitted to itself and outputs a predetermined detection signal. The extracting circuit extracts the message specifying information from the pager signal received and supplies the same to the message displaying apparatus in response to the detection signal. The message displaying apparatus displays the message specified by the message specifying information in a visually recognizable manner in response to the message specifying information. The pager signal employed in accordance with the present invention includes message specifying information for specifying a message along with destination information, which is different from the pager signal employed in a conventional apparatus including destination information and a message itself. The message specifying information includes a less number of characters compared with the body of the message. Therefore, in accordance with the pager terminal apparatus, the amount of data to be transmitted may be reduced. During transmission, the message specifying information only may be inputted, while the body of the message itself does not need to be entered. Therefore, the amount of operation by the caller may also be reduced. Furthermore, the page signal does not include the body of the message, so that secret the communication can be accomplished.

In accordance with another aspect of the invention, the radio pager system includes a station for transmitting a pager signal including destination information representing the destination and message information to be transmitted to the destination, a transmission terminal apparatus for supplying the destination information and the message information to the station, and a pager terminal apparatus for presenting a message based on the message information included in a received pager signal when it receives the pager signal and it determines that the received pager signal is destined for itself. The pager terminal apparatus includes a receiver for receiving an incoming pager signal, a detector for detecting that the pager signal received by the receiver is a signal transmitted to itself and for outputting a predetermined detection signal, an extracting circuit responsive to the detection signal for extracting message specifying information for specifying a message, from the message information of the pager signal received by the receiver, and a message displaying apparatus responsive to the message specifying information extracted by the extracting circuit for displaying the message specified by the message specifying information in a visually recognizable manner.

This radio pager system operates as follows. The caller provides the destination information and the message information to the station, using the transmission terminal apparatus. The station transmits via radio a pager signal including the destination information and the message information provided. The radio-transmitted pager signal is received by the receiver of the pager terminal apparatus. If the detector detects that this pager signal is destined for itself, the extracting circuit extracts the message specifying information from the message information of the pager signal. The message displaying circuit displays the message specified by the message specifying information in a visually recognizable manner in response to the extracted message specifying information. The body of the message need not be necessarily included in the pager signal. If the message specifying information is included, it is possible to display the message to the callee. The caller may provide only the message specifying information to the station if the correspondence between the message specifying information and the messages have been previously specified between the caller and the callee and included in the message displaying circuit. There is no need to provide a long message to the station, nor to transmit the body of message from the station. Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, features, aspects and advantages of the present invention will become more apparent from the following detailed description of the present invention when taken in conjunction with the accompanying drawings, which are given by way of illustration only, and thus are not limitative of the present invention, and wherein.

DESCRIPTION OF THE PREFERRED EMBODIMENTS

Figure 3:
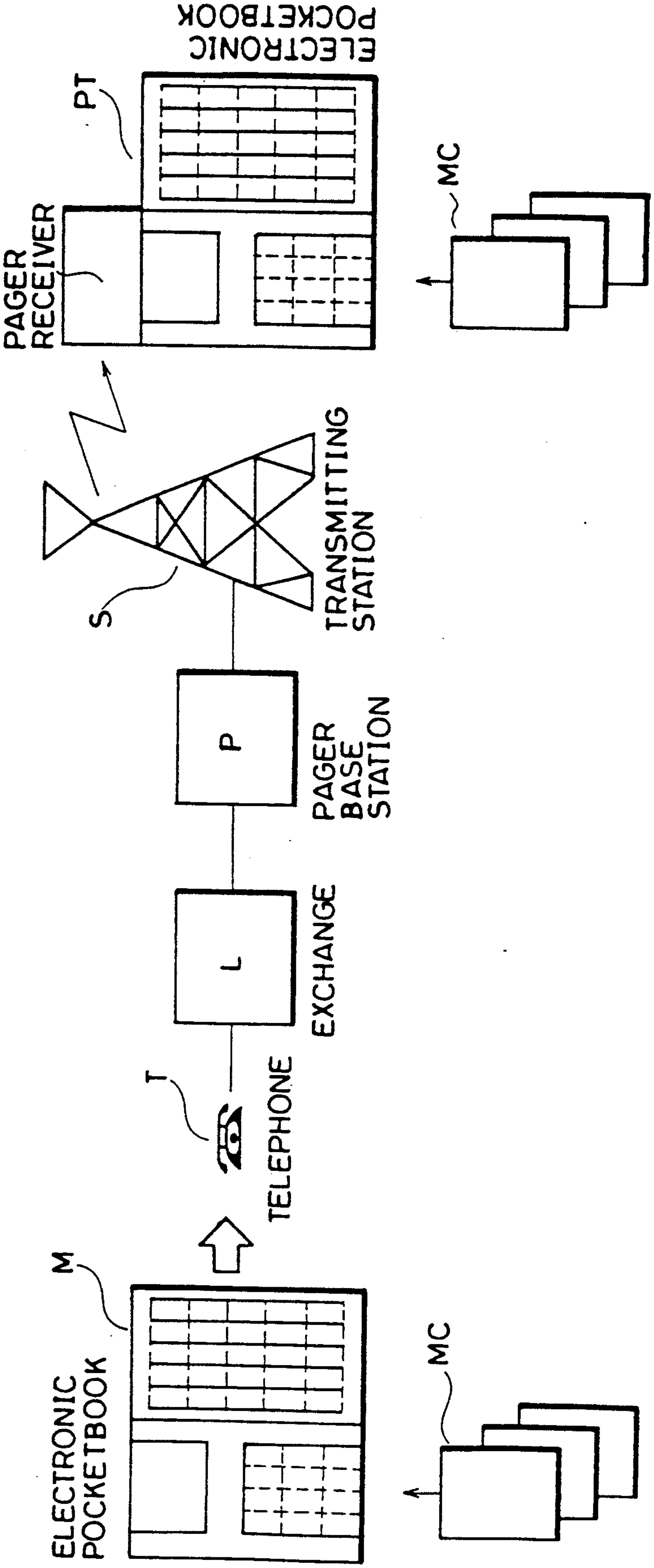
FIG. 3 is a typical diagram showing the structure of a first preferred embodiment of the present invention.

FIG. 3 is a typical diagram showing the structure of a radio pager system in accordance with the preferred invention. Referring to FIG. 3, this radio pager system includes a so-called electronic pocketbook carried about by the caller. A memory card MC may be detachably provided in the electronic pocketbook M, which stores a table including a plurality of paired messages predetermined by the caller and the callee and a message code corresponding to it. The table is hereinafter referred to as a "message table". The radio pager system further includes a pager base station P capable of being connected to a telephone T over a public telephone line and an exchange L, a transmitting station S for transmitting a pager signal supplied from the pager base station P, and an electronic pocketbook PT carried about by the callee, having a pager receiver for receiving a pager signal. The electronic pocketbook PT carried by the callee can also be provided detachably with a memory card MC in which is stored a message table identical to that of the electronic pocketbook M carried about by the caller.

The pager system shown in FIG. 3 operates as follows. The caller and the callee, as stated above, prepare a common message table in advance. Both the caller and the callee have memory cards MC in which the message tables are stored and which are carried along with the electronic pocket books. A table for a calling code assigned to each electronic pocketbook is also stored in the memory card MC. The caller first obtains a calling code of the callee by referring to the calling code table stored in the memory card MC using the electronic pocketbook M. The caller then chooses the message which he intends to transmit to the callee from the message table stored in the memory card MC using the electronic pocketbook M. The caller determines the message code assigned to the desired message. The caller calls the pager base station P over the public telephone line and the exchange L, operating the telephone T. At this time, if the electronic pocketbook M has an automatic calling function, the function of the electronic pocketbook M may be utilized.

The pager base station P, like in the conventional system, instructs the caller to input a call number of the pager terminal and a message code in accordance with a predetermined program. The caller, following the instruction from the pager base station P, inputs a call number of the pager terminal i.e., the electronic pocketbook PT carried about by the callee, and a message code of a desired message to the pager base station P by manipulating the push-buttons of the telephone T. The pager base station P transmits via radio the call number of the electronic pocketbook PT and the given message code in a predetermined format, from the transmitting station S.

The pager signal receiver of the electronic pocketbook PT receives the pager signal transmitted via radio from the transmitting station S of the pager base station, and supplies the same to the pager terminal PT. The pager terminal PT compares the call number included in the received pager signal with the call number assigned to the pager terminal itself. When both of the numbers coincide with each other, the electronic pocketbook PT determines that the pager signal is destined for it. In that case, the electronic pocketbook PT extracts a message code from the pager signal which it received. The pager terminal PT further searches the message table stored in the memory card MC attached to the pager terminal PT with the obtained message code as a key. The message having a corresponding message code is thereby retrieved from the message table. The pager terminal PT displays the retrieved message on a display such as a liquid crystal display device. Accordingly, the owner of the pager terminal PT may readily be aware of the incoming call message for him via the pager terminal PT and the contents of the message.

In this system, the information included in the pager signal transmitted from the transmitting station S includes a call number of the pager terminal PT carried about by the callee and a message code for specifying a message to be transmitted. In general, a message code is represented by much less characters compared with the body of the message. The amount of the traffic of the signal transmitted from the transmitting station S is by far decreased compared with the case in which the body of the message is transmitted without using a message code. The caller may transmit a considerably long message to the callee simply by searching the message table prepared in advance, choosing a desired message, and supplying a message code corresponding to the message to the pager base station P. It is not necessary to operate the telephone T for a long period of time in order to input a long message. The message table is prepared in the memory card MC, not in the pager base station P. Therefore, transmission and reception of a necessary and sufficient message between the caller and the callee may be effected only by making a common message table in advance between the caller and the callee and preparing the same in a memory card MC. The information transmitted, as stated above is a call number and a message code only. The body of the message is not transmitted, so that secret communication is provided.

Figure 4:
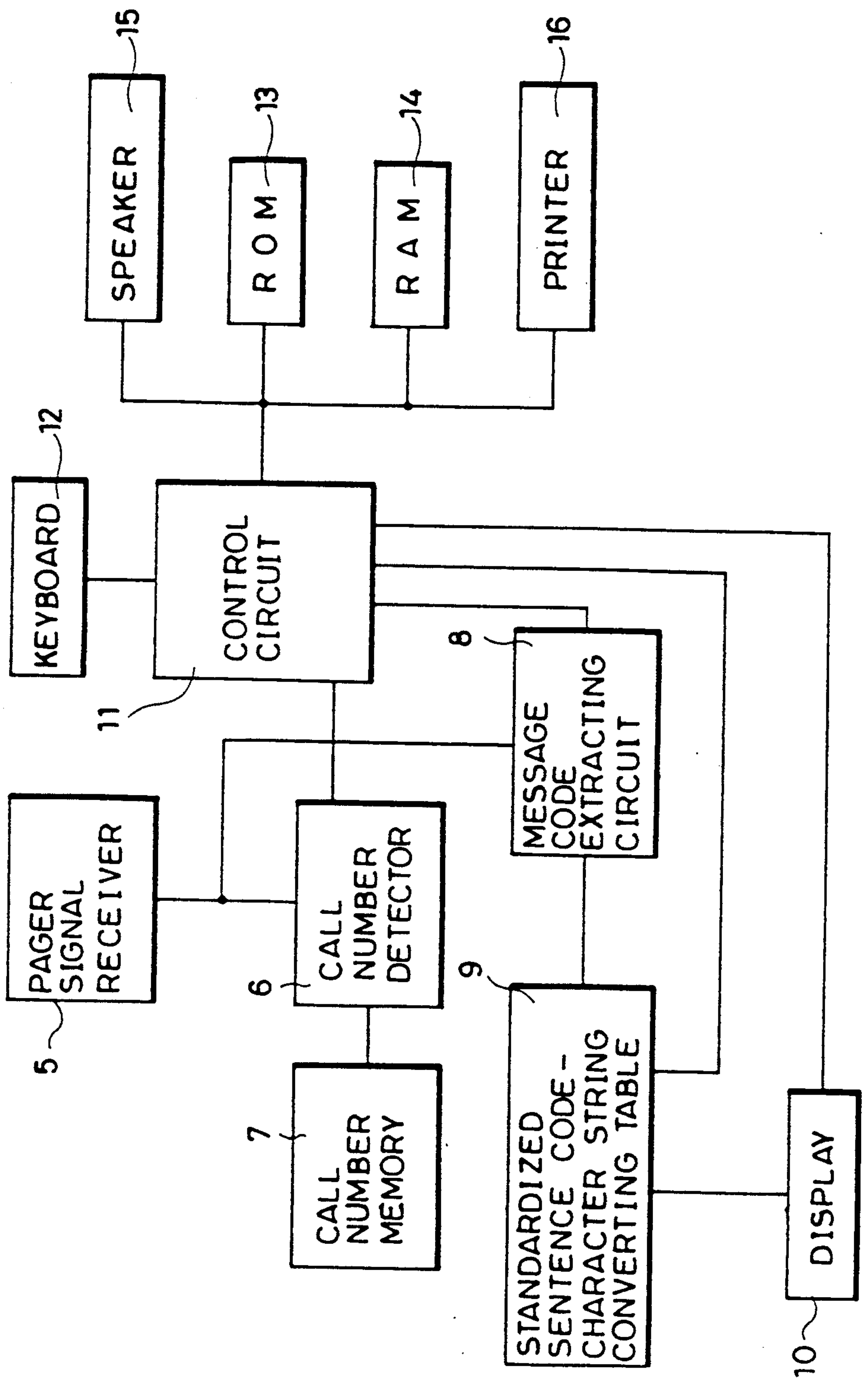
FIG. 4 is a block diagram of a pager terminal apparatus in accordance with the first preferred embodiment of the present invention.

FIG. 4 is a block diagram of an embodiment of the pager terminal apparatus PT used in the radio pager system of the present invention. Referring to FIG. 4, this pager terminal apparatus includes a pager signal receiver 5 for receiving a pager signal transmitted from the transmitting station S, a call number memory 7 for in advance a call number assigned to this pager terminal apparatus and a call number detector 6 for detecting whether the call number stored in the call number memory 7 is included in the received pager signal which the pager signal receiver 5 supplies. Further included is a message code extracting circuit 8 responsive to the call number detector detecting that the call number stored in the call number memory 7 is included in the pager signal for extracting a message code from the received pager signal, standardized sentence code-character string converting table 9 for converting the message code extracted by the message code extracting circuit 8 to a predetermined message information, and a display 10 for displaying character strings representing the message supplied from the converting table 9.

The pager terminal apparatus further includes a control circuit 11 for controlling the operations of the call number detector 6, the message code extracting circuit 8, the standardized sentence code-character string converting table (message table) 9 and the display 10 in accordance with a program prepared in advance. Also included is a ROM (Read-Only Memory) 13 in which a program to be executed by the control circuit 11 is stored in advance, a RAM (Random- Access Memory) 14 which the program uses as a working region, a speaker 15 driven by the control circuit 11 for generating a beep sound representing that there has been an incoming call in the pager terminal from the transmitting station S, a printer 16 for printing the information stored in the RAM 14 and the information of the standardized sentence code-character string converting table 9, under the control of the control circuit 11, and a manually operable keyboard 12 for generating a desired signal sequence in response to operation by the operator and for supplying the same to the control circuit 11.

Figure 1:
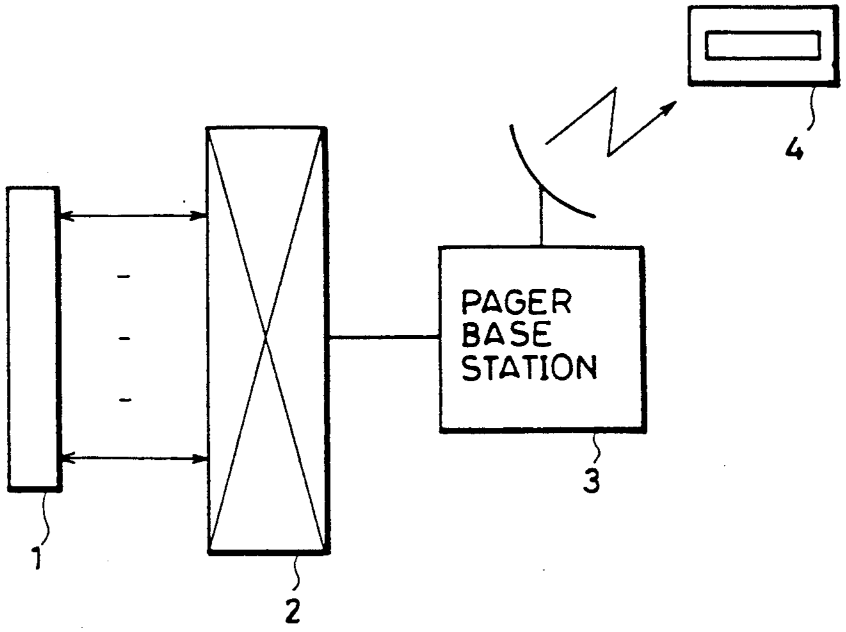
FIG. 1 PRIOR ART
FIG. 1 is a typical diagram showing the structure of a conventional radio pager system.
Figure 2:
FIG. 2 PRIOR ART
FIG. 2 is a typical diagram showing a communication format of a pager signal in a conventional radio pager system.

FIG. 2 is typical diagram showing the structure of the outline of the communication format used in the radio pager system in accordance with the present invention. Referring to FIG. 2, this communication format includes a synchronous signal bit string "SYNC" which is a special signal sent for establishing and maintaining a fixed relationship in a synchronous system such as one between the pager terminal PT and the pager base station P, a calling code "ADDRESS" representing an address for specifying a station and so on in the communication network, and a message code "MESSAGE NO." for specifying a message transmitted from the caller to the callee.

Referring to the Table 1, in the present invention the message code and the message are prepared in advance in a form such as the message table as shown in Table 1. The message code is a 2-digit number, and takes 100 patterns of 0 to 99. A message as shown in the right section of the Table 1 is assigned to each message code in advance. This message converting table is prepared by the caller and the callee, converted to data which can be electronically processed, and stored in the memory card MC.

TABLE 1

| Message Code | Message |
|---|---|
| #00 | Please give a telephone call to the office |
| #01 | Please come back to the office immediately |
| #02 | Your client has been here to see you |
| | . |
| | . |
| | . |
| #99 | |

The radio pager system and the pager terminal apparatus in accordance with the invention operates as follows with reference to FIGS. 2 to 4.

Initialization

When the pager system in accordance with the present invention is used, it is necessary for the caller and the callee and change "make" to prepare to make a message converting table as shown in Table 1 including a plurality of paired message codes and a corresponding message. Furthermore, it is necessary to convert the message converting table into data which can be electronically processed and stored in the standardized sentence code-character string converting table 9 of the pager terminal PT.

In order to create this converting table within the memory card MC, the operator inputs the message converting table shown in Table 1 in the pager terminal PT, and has the table stored in the standardized sentence code-character string converting table 9 in accordance with the command of the control circuit 11, which operates according to the program stored in advance in the ROM 13, utilizing the numeric key and the alphabetic key (not shown) of the keyboard 12. During input, the data inputted is displayed on the display 10 for confirmation by the operator.

The standardized sentence code-character string converting table 9 needs to be prepared in advance in the memory card MC carried about by the caller and the memory card MC carried about by the callee. In general, the memory cards MC which store two identical data may be obtained by making this converting table in either one of the memory cards MC, and then copying this converting table in the other.

Operation of Transmission

Suppose that the caller is to transmit a message to a person who carries a pager terminal apparatus. The caller first, calls the pager base station P over the telephone T and the exchange L, and then inputs a call number of the callee and a message code corresponding to the message to be transmitted from the pager base station P in accordance with the instruction of the control computer of the pager base station T. The pager base station P radio-transmits via radio the inputted call number and the message code from the transmitting station S in accordance with a communication format shown in FIG. 2, as described with respect to Table 1.

As is apparent from the description above, the data transmitted from the transmitting station S does not include the body of the message. Even if other person should pick up this radio communication, all that he can obtain is the call number and the message code only, so that the body of the message cannot be obtained.

Operation of Receiving

The pager signal receiver 5 of the pager terminal receives the pager signal transmitted from the transmitting station S. and supplies it to the call number detector 6 and the message code extracting circuit 8.

The call number detector 6 checks if the call number included in the pager signal received coincides with the number stored in the call number memory 7. When there is one which coincides with the call number stored in the call number memory 7 in the pager signal, the call number detector 6 supplies a signal to the control circuit 11 indicating the detection of a pager signal destined for itself.

The control circuit 11 causes the message extracting circuit 8 to operate in response to the signal applied from the call number detector 6. The message extracting circuit 8 extracts a message code "MESSAGE NO." directly following the call number identical with the call number stored in the call number memory 7, and supplies it to the standardized sentence code-character string converting table 9. The standardized sentence code-character string converting table 9 retrieves a message corresponding to the message code supplied from the message code extracting circuit 8 from the converting table shown in Table 1 in accordance with the instruction of the control circuit 11. The retrieved character string is displayed on the display 10.

The control circuit 11 also drives the speaker 15 in response to the signal from the call number detector 6, and causes it to generate a beep sound reporting that there has been an incoming call. The callee is warned that there has been an incoming call by this beep sound, and hereinafter inspects the display 10 of the pager terminal PT and to read the message displayed thereon.

In the embodiment above, the standardized sentence code-character string converting table 9 is described as a memory which is rewritable. The invention, however, is not limited to this, and the converting table may be prepared in advance in a ROM and the like which cannot be rewritten. The standardized sentence code-character string converting table 9 need not be stored in the memory card MC, and it may be prepared in an RAM or an ROM incorporated in the terminal.

Figure 5:
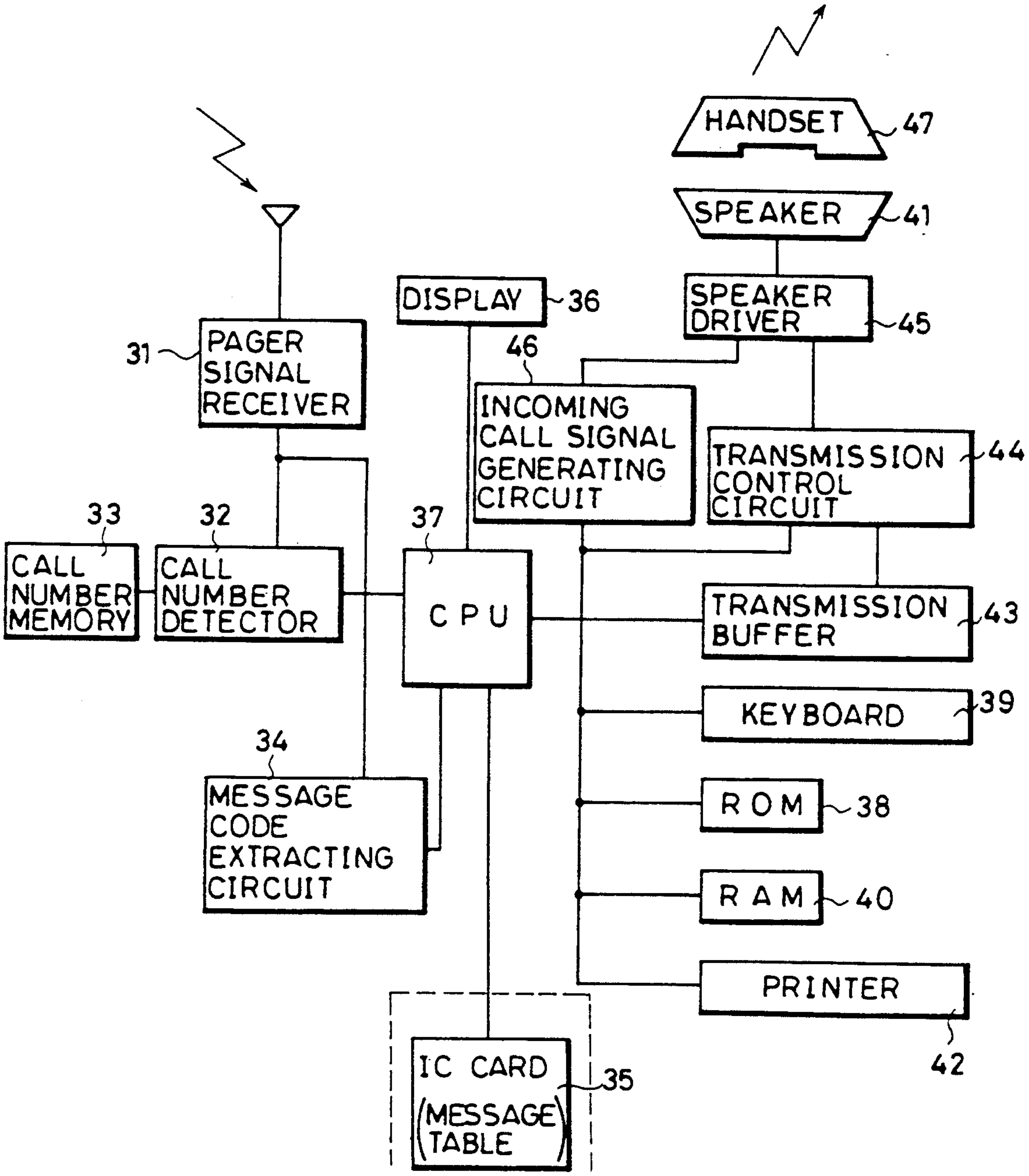
FIG. 5 is a block diagram of a pager terminal apparatus in accordance with a second preferred embodiment of the present invention.

FIG. 5 is a block diagram of another embodiment of the pager terminal apparatus used in the radio pager system of the present invention. Referring to FIG. 5, this pager terminal apparatus includes a pager signal receiver 31 for receiving a pager signal transmitted from the transmitting station S (FIG. 3) of the pager base station P, a call number memory 33 in which the call number assigned to this pager terminal is prestored a call number detector 32 for detecting if a received call number coincides with the call number stored in the call number memory 33 in the pager signal received by the pager signal receiver 31, a message code extracting circuit 34 responsive to the call number detector 32 detecting that there is included a call number which coincides with that stored in the call number memory 33 in the received pager signal, for extracting a message code associated with the call number from the pager signal, and an IC card 35 which is a memory card where there is stored a message table for converting a message code extracted by the circuit 34 to a character string representing a message specified by the message code.

The pager terminal apparatus further includes a display 36 including a liquid crystal display device and so on for displaying a message obtained by the message table of the IC card 35 and a CPU (Central Processing Unit) 37 which is control means for controlling the operations of the call number detector 32, the message code extracting circuit 34, the IC card 35, and the display 36 in accordance with a program prepared in advance. Also included is a manually operable keyboard 39 for generating a desired signal sequence and supplying it to the CPU 37 in response to the operation of the operator, a speaker 41 driven by a speaker driver 45 for generating a beep sound corresponding to the signal applied from the CPU 37, a ROM 38 where a program which the CPU 37 executes is written in advance, an RAM 40 which the CPU 37 uses as a working region, and a printer 42 controlled by the CPU 37 for printing the data stored in the RAM 40 and the IC card 35.

The pager terminal apparatus further includes a transmission buffer 43 connected to the CPU 37 for temporarily storing a call number of the callee and a message code supplied from the CPU 37, a transmission control circuit 44 for supplying the transmission data which has been temporarily stored in the transmission buffer 43 to the speaker driver 45 based on the command given by the operator over the keyboard 39, thereby causing the speaker 41 to generate a beep sound corresponding to the transmission data, and an incoming call signal generating circuit 46 connected to the CPU 37 for generating an incoming call signal to be supplied to the speaker driver 45 when there is an incoming call in this pager terminal apparatus. The speaker 41 is acoustically coupled to a handset 47 connected to the public telephone line, and the transmission data which has been temporarily stored in the transmission buffer 43 is sent on the public telephone line over the handset 47.

The message table stored in the IC card 35 is identical with the above-mentioned one shown in Table 1. Therefore, the detailed description thereof will not be repeated here.

The operation of this pager terminal apparatus will be described in the following.

Initialization

The initializing process in the pager terminal apparatus of the second embodiment is the same as the initializing process conducted in the pager terminal apparatus (FIG. 4) of the first embodiment. The operator prepares the message table shown in Table 1 in the IC card 35 by operating the keyboard 39 in accordance with a program for message table input stored in the ROM 38 and executed by the CPU 37. As stated above, the IC card 35 is detachable from the pager terminal apparatus. The IC card 35 may be copied using a personal computer or an electronic pocketbook and the like, and a common message table may be readily shared by a plurality of users.

Operation of Transmission

When the user of the pager terminal apparatus shown in FIG. 5 transmits a message to another user, the operation described below is conducted. The operator operates the keyboard 39 to have the CPU 37 display the call number table stored in the IC card 35 on the display 36. The operator determines the number of the desired person from the displayed call number table. The storage region prepared in the RAM 40 stores the value. Then the operator inputs a necessary command for the CPU 37, operating the keyboard 39. The display 36 displays the message table stored in the IC card 35. The operator operates the keyboard 39 and selects a message code corresponding to the desired message from the message table displayed on the display 36. The storage region prepared in advance in the RAM 40 stores the obtained value.

The call number and the message code selected and stored in the RAM 40 are displayed on the display 36 by the CPU 37. The message corresponding to the message code displayed is also retrieved from the message table of the IC card 35, and then displayed on the display 36. The operator confirms that the data displayed on the display 36 is a desired one, and presses a predetermined transmission start key (not shown) of the keyboard 39.

The call number and the message code which have been stored in the RAM 40 are supplied to the transmission buffer 43 by the CPU 37, and temporarily stored therein. The transmission control circuit 44 converts the transmission data stored in the transmission buffer 43 to a DMF (Dual Mode Frequency) signal in accordance with the instruction from the CPU 37, and supplies it to the speaker driver 45. The speaker driver 45 drives the speaker 41 in response to the signal applied from the transmission control circuit 44, and the speaker generates a sound corresponding to the transmission data which has been stored in the transmission buffer 43. The generated sound is converted to an analog electric signal by the handset 47, and supplied to the public telephone line. The above mentioned DMF signal is the same as a signal generated by operating the push-buttons in a telephone having normal push-buttons.

On receiving the call number and the message code from the pager terminal, the pager base station P transmits via radio the data which it has received in accordance with the communication format shown in FIG. 2, as described with respect to Table 1.

Operation of Receiving

In the pager terminal apparatus shown in FIG. 5, the receiving section has the same structure as that of the pager terminal apparatus of the first embodiment shown in FIG. 4. Accordingly, the detailed description of the operation thereof is not repeated here.

As stated above, in accordance with the pager terminal apparatus according to the second embodiment, in transmitting a message, the selected call number, selected message code and a message corresponding to the selected message code are displayed on the display 36. Inputting of a message to be transmitted, therefore, may be conducted readily and without an error. The transmission data is transmitted to the pager base station P over the speaker acoustically coupled to the handset of the telephone. It is not necessary for the operator to operate the pushbuttons of the telephone, and the labor and errors of the operation are reduced compared with the case in which the operator directly operates the telephone T as in the first embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A pager terminal apparatus, comprising:

receiving means for receiving an incoming pager signal, said received pager signal including destination information representing the destination and coded message information for specifying a message for said destination;

detection means, coupled to said receiving means, for detecting if said received pager signal is a signal intended for the pager terminal apparatus and for generating a predetermined detection signal indicative thereof;

extracting means, coupled to said receiving means and responsive to said predetermined detection signal, for extracting said coded message information from said received pager signal;

message displaying means, responsive to said coded message information of said received paper signal extracted by said extracting means, for displaying said specifying message on display means in a visually recognizable manner, said message displaying means comprising converting means, coupled to said extracting means, for converting said coded message information of said received pager signal into said specifying message in accordance with a personal message conversion table comprising plural coded message information/specifying message pairs prepared by an operator of the pager terminal apparatus and a caller;

destination information storage means for storing destination information associated with predetermined destinations of other pager terminals;

manually operable keyboard means, coupled to said destination information storage means, for generating a desired signal sequence of an outgoing pager signal;

transmission signal generating means for generating said outgoing pager signal including coded message information of said desired signal sequence generated by said keyboard means and said destination information stored in said destination information storage means; and transmission means for transmitting said outgoing pager signal to a pager signal base station over a predetermined signal line in accordance with a predetermined protocol.

2. The pager terminal apparatus according to claim 1, wherein said predetermined signal line includes a public telephone line.

3. The pager terminal apparatus according to claim 2, wherein said transmission means includes means for converting said outgoing pager signal into a modulated sound signal, said modulated sound signal being supplied to a handset of a telephone connected to said public telephone line.

4. The pager terminal apparatus according to claim 1, wherein said destination information storage means stores a plurality of said destination information.

5. The pager terminal apparatus according to claim 4, further comprising selection means, responsive to a specific signal sequence generated by said keyboard means, for selecting one of said plurality of destination information stored in said destination information storage means and for supplying said selected destination information to said transmission signal generating means.

6. The pager terminal apparatus according to claim 1, further comprising:

means for supplying said coded message information designated by said desired signal sequence to said converting means, the specified message of said outgoing pager signal being displayed by said display means.

7. A radio pager system comprising:

a station for transmitting a pager signal including destination information representing a destination and coded message information to be transmitted to said destination;

transmission terminal apparatus for supplying said destination information and said coded message information to said station; and pager terminal apparatus for receiving said pager signal and for displaying a message based on the coded message information included in said received pager signal, when said received pager signal is destined for said pager terminal apparatus, said coded message information being encoded in accordance with a message converting table prepared by a caller and a pager terminal subscriber, said message converting table being stored within said transmission terminal apparatus, said pager terminal apparatus comprising receiving means for receiving a transmitted pager signal, detection means, coupled to said receiving means, for detecting that said received pager signal is a pager signal transmitted to said pager terminal apparatus, and for generating a predetermined detection signal based on said destination information included in said received pager signal, extracting means, coupled to said receiving means and responsive to said predetermined detection signal, for extracting said coded message information from said received pager signal, and message displaying means, coupled to said extracting means, including converting means for converting said coded message information into caller message information, said message displaying means displaying said caller message information in a visually recognizable manner on display means, said transmission terminal apparatus including conversion means for converting said coded message information into said caller message information, displaying means, coupled to said conversion means, for displaying said caller message information generated by said conversion means, destination storage means for storing said destination information input by the caller and associated with a predetermined destination, manually operable keyboard means, coupled to said destination information storage means, for generating a desired signal sequence upon input by the caller, transmission signal generating mean for generating said pager signal including said coded message information designated by said desired signal sequence and said destination information stored in said destination information storage means, and transmission means for transmitting said pager signal to said station over a predetermined signal line in accordance with a predetermined protocol.

8. The radio pager system according to claim 7, wherein said predetermined signal line comprises a public telephone line.

9. The radio pager system according to claim 8, wherein said transmission means of said transmission terminal apparatus comprises means for converting said pager signal into a modulated sound signal, said modulated sound signal being supplied to a handset of a telephone connected to said public telephone line.

10. The radio pager system according to claim 7, wherein said destination information storage means stores a plurality of said destination information.

11. The radio pager system according to claim 10, wherein said transmission terminal apparatus further comprises:

selection means, responsive to a specific signal sequence generated by said manually operable keyboard means, for selecting one of said destination information stored in said destination information storage means and for supplying said selected destination information to said transmission signal generating means.

12. The radio pager system according to claim 7, wherein said transmission terminal apparatus further comprises:

means for supplying said coded message information designated by said desired signal sequence to said conversion means.

13. A pager system comprising:

a central station for transmitting a pager signal including destination information representing a destination and coded message information for the destination;

transmission terminal means for generating and supplying said destination and said coded message information to said central station; and pager terminal means for receiving said pager signal and for displaying a message in accordance with said coded message information when said pager terminal means is the destination represented by said destination information of said pager signal, said coded message information being encoded in accordance with a code conversion table prepared by a caller and a pager terminal subscriber, said code conversion table being stored within said transmission terminal means and said pager terminal means, said transmission terminal means comprising electronic pocketbook means having storage means for storing said code conversion table, display means for displaying said code conversion table, keyboard mean for accessing said code conversion table, RAM storage means, coupled to said keyboard means, for storing said destination information and a sequence of said coded message information input by the caller, said sequence of coded message information being displayed on said display means along with corresponding ones of said caller message information and said destination information, for inspection by the caller, transmission buffer means, coupled to said RAM storage means, for temporarily storing said sequence of coded message information upon activation of a transmission start switch by the user of said transmission terminal means, transmission control means, coupled to said transmission buffer means and said keyboard means, for converting said sequence of coded message information and said destination information into a transmission signal, and speaker means, coupled to a telephone handset, for generating sound in accordance with said transmission signal, handset generating an analog electrical signal representative of said pager signal in response thereto.

14. The pager system according to claim 13, wherein said transmission signal is a dual mode frequency signal.

15. The pager system according to claim 13, wherein said transmission signal is supplied to said central station as said pager signal via a public telephone line.

* * * * *